(12) United States Patent
Li et al.

(10) Patent No.: US 6,414,460 B1
(45) Date of Patent: Jul. 2, 2002

(54) LOW COST 1/8TH, 1/16TH MICRO-STEPPING MOTOR DRIVE SYSTEM

(75) Inventors: Yanqing Li, Jersey City, NJ (US); Luu T. Pham, Trumbull; Mark E. Sasso, Naugatuck, both of CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 09/752,174

(22) Filed: Dec. 29, 2000

(51) Int. Cl.[7] .............................................. G05B 19/40
(52) U.S. Cl. ...................... 318/685; 318/696; 318/611; 318/432; 318/460
(58) Field of Search ................................ 318/696, 685, 318/611, 432, 460

(56) References Cited

U.S. PATENT DOCUMENTS

| | | | |
|---|---|---|---|
| 4,710,691 A | 12/1987 | Bergstrom et al. | 318/696 |
| 5,216,345 A | * 6/1993 | Eyerly | 318/685 |
| 5,352,963 A | * 10/1994 | Garand et al. | 318/696 |
| 5,359,271 A | 10/1994 | Husher | 318/696 |
| 5,410,338 A | 4/1995 | Jadrich et al. | 347/264 |
| 5,852,354 A | 12/1998 | Andrews | 318/562 |

* cited by examiner

Primary Examiner—Karen Masih
(74) Attorney, Agent, or Firm—Paul Levitsky

(57) ABSTRACT

The invention is a low-cost stepper motor drive system comprising a microstepping motor and a logic circuit. The logic circuit includes two integrated circuits for controlling one or more phases of the microstepping motor. Each one of the integrated circuits is a motor driver capable of producing up to sixteen microsteps per full step. Further, each one of the integrated circuits takes a set of analog/digital bits and a phase bit as input. Additionally, within the logic circuit, there is included a microcontroller for controlling the microstepping motor. The microcontroller comprises six control bits, which direct the controller in outputting a set of step sequences to the integrated circuits. The microcontroller can run in one of two program modes: a stand-alone mode which utilizes two profile bits to select one of a set of four slew velocities and which will accelerate the microstepping motor then slew at a preprogrammed velocity as selected by the two profile bits; and, a pulse controlled mode, wherein the motor velocity of the microstepping motor is directly related to an input pulse signal wherein each time the microcontroller receives the input pulse signal the microcontroller will output a step to the integrated circuits. The logic circuit further includes a driver circuit for driving current through each one of the motor phases, and two snubber circuits operatively located between the outputs of each one of the motor phases of each integrated circuit for stabilizing the voltage level of the logic circuit.

20 Claims, 11 Drawing Sheets

FIG. 7 overcurrent / short circuit detection circuitry

LOW COST 1/8TH, 1/16TH MICRO-STEPPING MOTOR DRIVE SYSTEM

RELATED APPLICATIONS

Reference is made to application Ser. No. 09/752,161 entitled a ⅛th AND ⅙th MICRO-STEPPING MOTOR DRIVE SYSTEM ARCHITECTURE, assigned to the assignee of this application and filed on even date herewith.

FIELD OF THE INVENTION

The present invention relates generally to the field of motor drive systems utilized for driving office equipment and/or media feed systems; and, more specifically, to the field of micro-stepping motors and motor control torque resonance and acoustic noise reduction.

BACKGROUND OF THE INVENTION

Though there are motors of varied kind, shape and configuration within the equipment that serves our daily lives (everything from office equipment to cameras), they all serve the basic purpose of converting electrical energy into mechanical energy to drive a system component. One segment of this diverse motor population is represented by the group referred to as "stepper motors". These motors convert a series of electrical pulses into rotational movements of specific duration. The movement resulting from each pulse is consistent both in time and space, thus making stepper motors an ideal means for positioning objects or media.

One example of the use of a stepper motor to accurately and consistently position an object is disclosed in U.S. Pat. No. 5,410,338 for a Method And Apparatus For Moving An Object With Uniform Motion, issued Apr. 25, 1995 to Jadrich et al. (hereinafter referred to as "Jadrich"). Jadrich discloses an apparatus for printing an image to an object. The apparatus comprises a lead screw adapted to move the object to be printed upon and a stepper motor adapted to rotate the lead screw in a series of rotational steps wherein each step was less than that of the lead screw. Thus, Jadrich is an excellent example of a drive need that is successfully met by the use of a stepper motor. In this case, the lead screw, for each revolution, possessed a predetermined pattern of relationships between an amount of displacement of the object and each step of the stepper motor.

Another example of the use of stepper motors is provided by U.S. Pat. No. 5,852,354 for a Mutiplexing Rate Generator/Counter Circuit For Controlling Stepper Motors issued Dec. 22, 1998 to J. Randolph Andrews (hereinafter referred to as "Andrews"). In Andrews, a multiplexing circuit was provided so that up to sixteen different stepping motors could share a single rate generator.

As the stepper motor population group diversified with the myriad applications that the motor population could serve, stepper motors were modified and redefined through control of the circuits that guide the electrical impulses that drive the motors. One of the early problems that led to such modification was the determination that when the motor was running at conventional full or half-step mode, there was a significant increase in noise level and torque resonance. The answer to the problem was found in "micro-stepping" the motor.

The increase in noise and torque resonance are a byproduct of the conventional stepper motor design. Permanent magnet type stepper motors generally comprise coil windings, magnetically conductive stators and a permanent magnet rotor. An electromagnetic field having opposite poles (a north and a south pole) is created when the coil winding is energized. The magnetic field is carried by the magnetically conductive stators, thus causing the rotor to align itself with the magnetic field. The field, in turn, can be shifted by "stepping" (through sequentially energizing) the stator coils to generate a rotary motion. Various forms of stepping exist; these include: "one phase on" and "two phase on" stepping, as well as half-stepping.

Half-stepping occurs when an "off" state is inserted between transitioning phases, thus cutting the stepper motor's full step angle in half. Half stepping, however, results in a loss of torque compared to other forms of stepping such as "two phase on". The loss of torque is the result of one of the coil windings not being energized during alternate half steps, thus reducing the electromagnetic force being exerted on the rotor.

Coil windings too, can be of varied type such as "bipolar" or "unipolar" winding. In bipolar coil winding, each phase consists of a single winding. If the current flow in the windings is reversed through switching, then the electromagnetic polarity of the phase is reversed. Unipolar winding, on the other hand, consists of two windings on a common pole. The opposite poles are created when the separate windings are energized. In unipolar winding, the electromagnetic polarity from the drive to the coil windings is not reversed as is the case with bipolar windings. Unipolar windings though, produce less torque than their bipolar counterparts because the energized coil only utilizes half as much of the conductive winding (typically copper).

In addition to problems with torque in its many forms, stepper motors generate a resonant frequency as a result of their basic spring-mass configurations. When the motor's step rate equals the motor's natural frequency, there is an increase in the noise level of the motor as well as an increase in motor vibration. In addition to the increased noise burden on system users, continued vibration can weaken the system structure and efficiency.

Changing the step rate or microstepping the motor are the two most common means of reducing resonance problems. Microstepping divides a full step into smaller steps and helps reduce noise levels and produce smoother output motion in addition to reducing resonance.

The microstepping of a motor has been disclosed in the prior art with reference to the addressing of specific needs. Such a need is answered in U.S. Pat. No. 5,359,271 for a Microstepping Bipolar Stepping Motor Controller For Document Positioning issued Oct. 25, 1994 to Frederick K. Husher (hereinafter referred to as "Hushes"). In Husher, one object of the invention was to provide an inexpensive controller that could drive a stepping motor in a microstep mode while yielding a multiple of defined position steps as compared to the number of physical motor poles.

Another need answered by microstepping a motor is disclosed in U.S. Pat. No. 4,710,691 for a Process And Apparatus For Characterizing And Controlling A Synchronous Motor In Microstepper Mode issued Dec. 1, 1987 to Bergstrom et al. (hereinafter referred to as "Bergstrom"). Bergstrom discloses the use of motor characterization stored in memory for use as a control of the rotational motion of the stepper motor.

The prior art, in addressing such issues as resonance and motion control, has still failed to produce a relatively simple drive system that can be easily adapted to a variety of equipment in a simple, yet efficient, way. There exists a need for a low-cost, easily replicable, micro-stepping motor in which the torque resonance and noise levels are reduced over those of prior art motors.

SUMMARY OF THE INVENTION

In the present invention, in a low-cost stepper motor drive system is provided.

The drive system comprises a micro-stepping motor and a logic circuit. The unique configuration of the circuit logic circuit provides a means of addressing the needs of the art field. The logic circuit includes two integrated circuits for controlling one or more phases of the micro-stepping motor. Each one of the integrated circuits is a motor driver capable of producing up to sixteen micro-steps per full step. Further, each one of the integrated circuits takes a set of analog/digital bits and a phase bit as input.

Additionally, within the logic circuit, there is included a micro-controller for controlling the micro-stepping motor. The micro-controller further comprises six control bits, which direct the controller in outputting a set of step sequences to the integrated circuits. The control bits further comprise a direction bit, a mode bit and a profile/index bit. The direction bit directs the micro-stepping motor to run in a clockwise or a counterclockwise direction as determined by a system configuration. The mode bit sets the micro-stepping motor to run in ⅛th or ¹⁄₁₆th step. The micro-controller can run in one of two program modes as selected by the profile/index bit, the program modes further comprise a stand-alone mode and a pulse controlled mode.

The stand-alone mode utilizes two profile bits to select one of a set of four slew velocities. The stand-alone mode will accelerate the micro-stepping motor then slew at a preprogrammed velocity as selected by the two profile bits.

In the pulse controlled mode, however, the motor velocity of the micro-stepping motor is directly related to an input pulse signal wherein each time the micro-controller receives the input pulse signal the micro-controller will output a step to the integrated circuits.

The logic circuit further includes a driver circuit for driving current through each one of the motor phases, and two snubber circuits operatively located between the outputs of each one of the motor phases of each integrated circuit. The snubber circuits serve the purpose of stabilizing the voltage level of the logic circuit. Each one of the snubber circuits further comprises a resistor and a capacitor.

DETAILED DESCRIPTION OF THE PREFERRED EMBODIMENTS

This low-cost microstepping motor drive utilizes an integrated circuit such as the Allegro A3957 mixed signal integrated circuit (I.C.) commercially available from Allegro Microsystems Inc. of Worcester, Mass., and a micro-controller such as the PIC16C63A commercially available from Microchip Technology Inc. of Chandler, Ariz. The driver circuit can be a stand-along drive with preprogrammed motion profile, or an indexing drive which requires an external stepping pulse. Other control signals such as direction, profile, power level, and running mode selections, as well as active short circuit detection, are included within the driver circuit.

Figure 1:
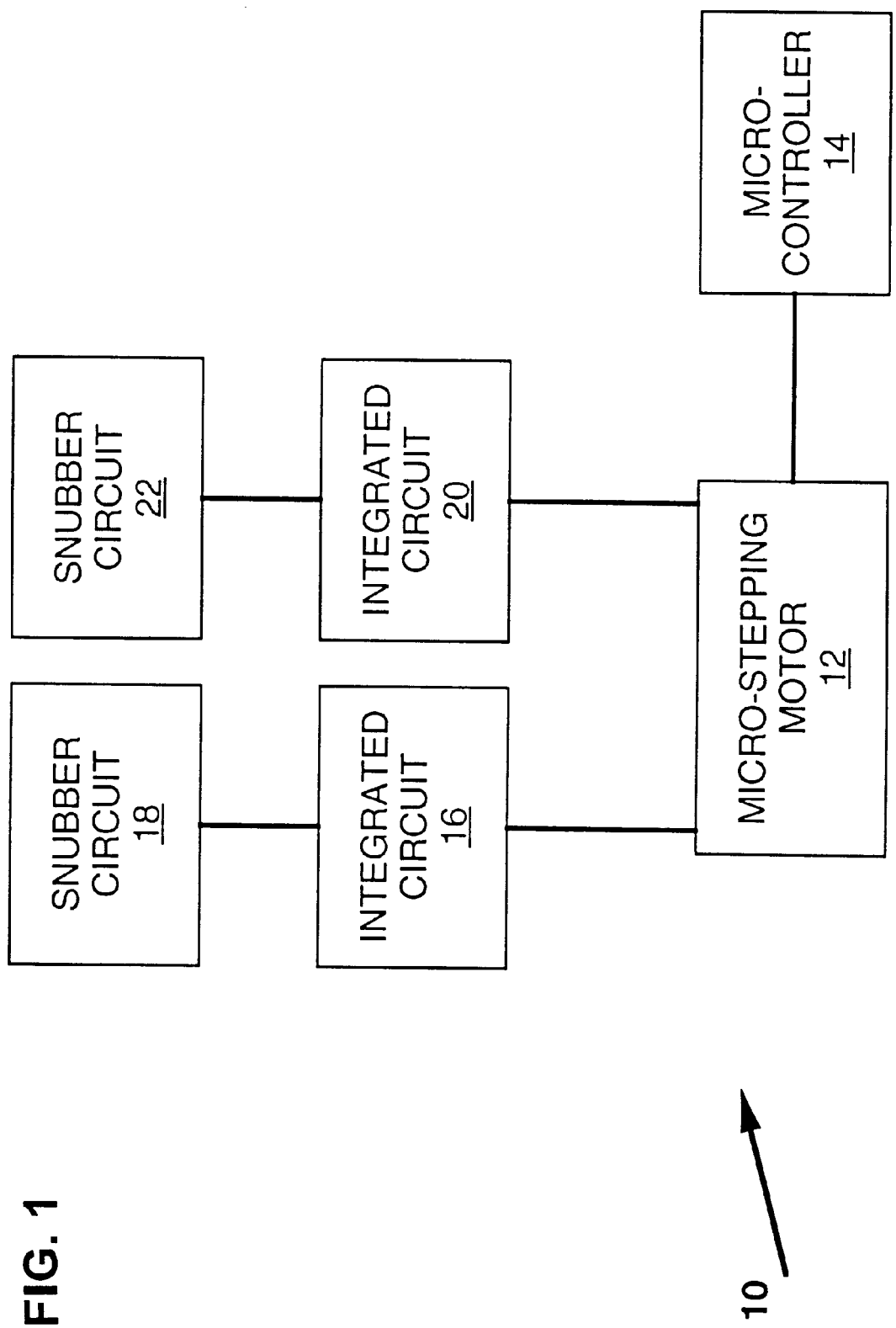
FIG. 1 is a block diagram of the system of the present invention.

Turning to FIG. 1, there is shown a block diagram of the system of the current invention.

The system 10 includes microstepping motor 12 under control from microcontroller 14. Additionally, two (2) integrated circuits 16 and 20 are operatively connected to microstepping motor 12. Integrated circuits 16 and 20 have a corresponding snubber circuit 18 and 22 respectively. Each of these system components is described in more detail herein.

Figure 2A:
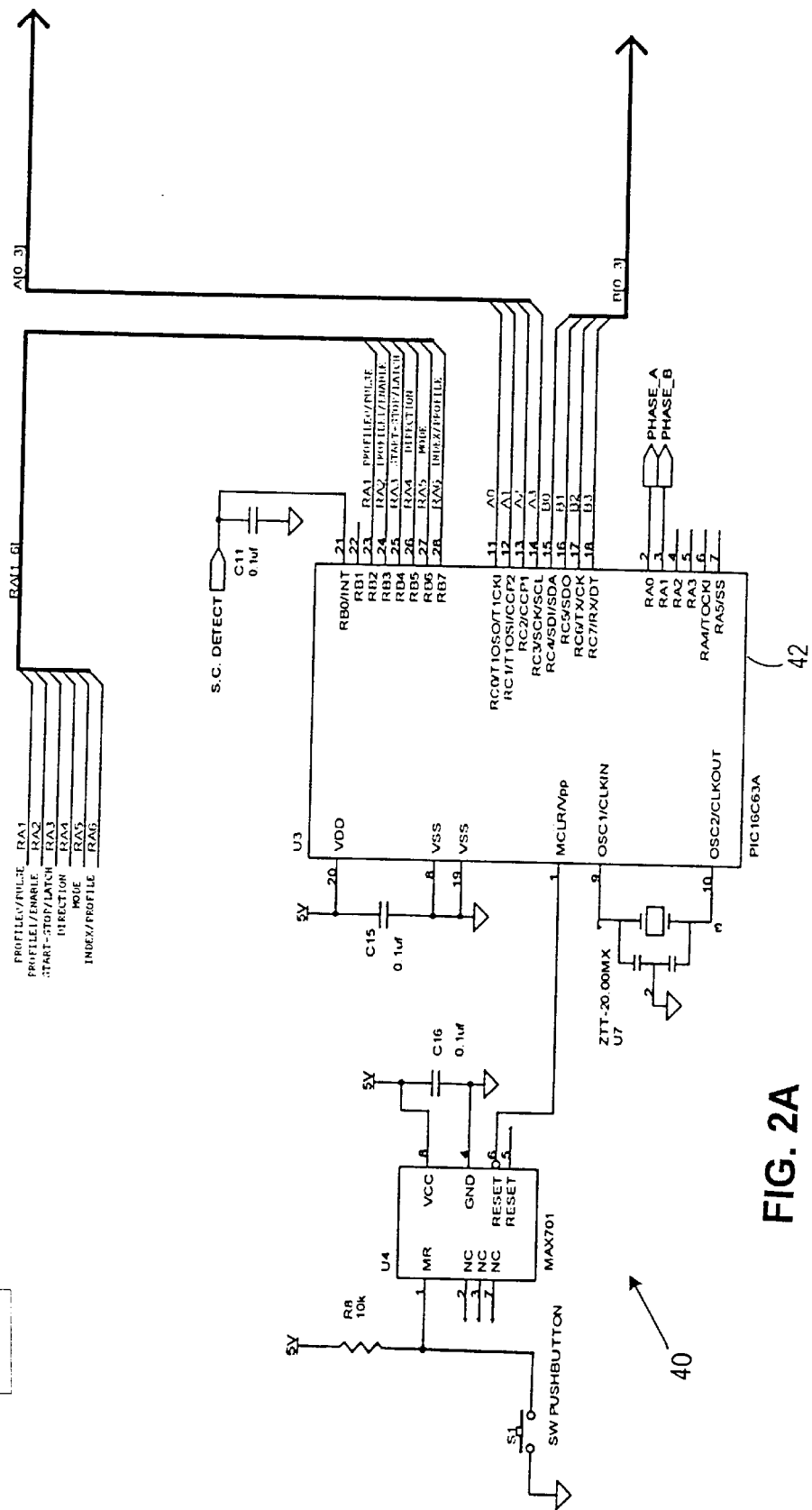
FIG. 2 is a schematic of the circuit of the present invention.
Figure 2B:
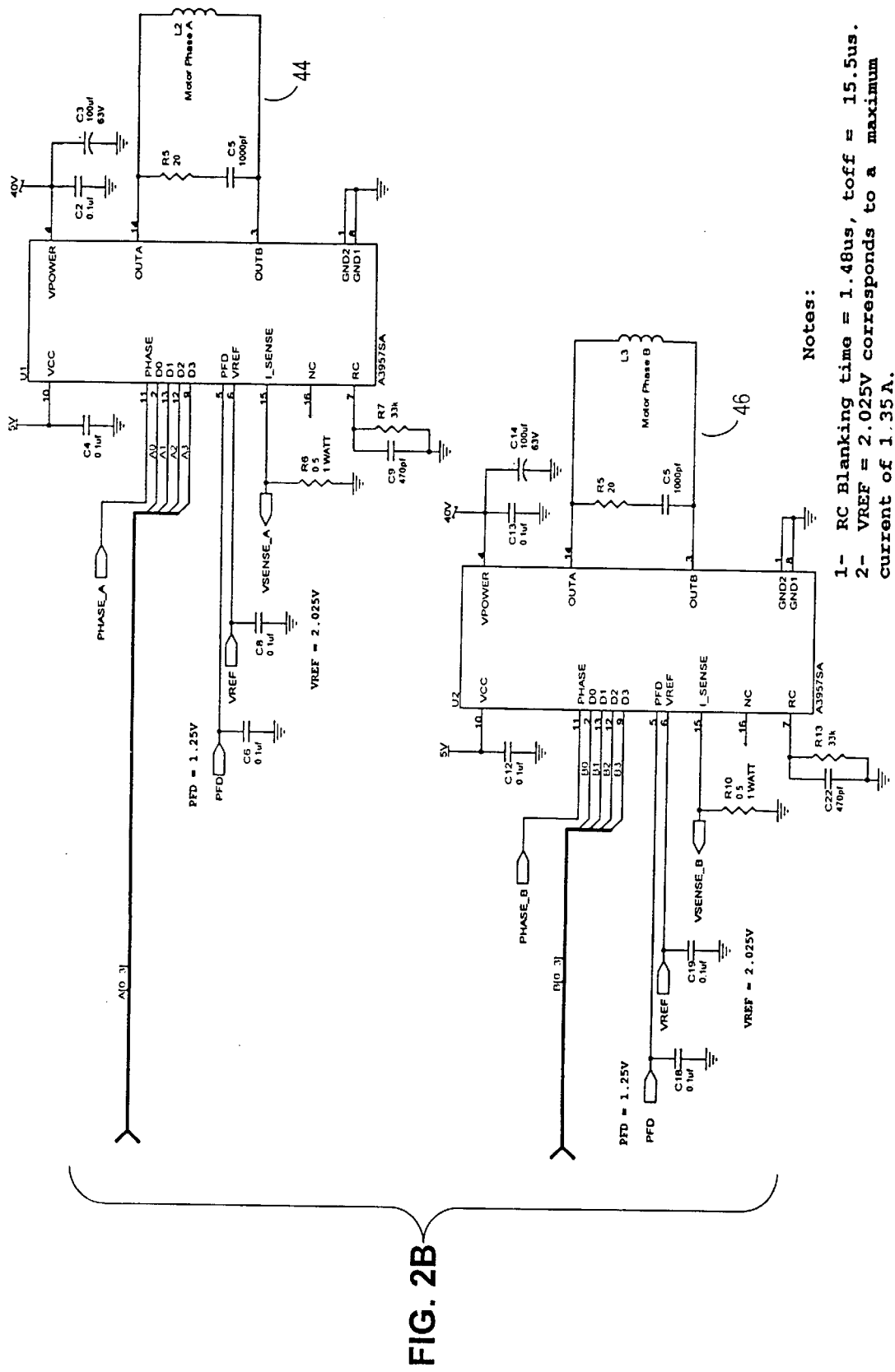
Figure 2C:
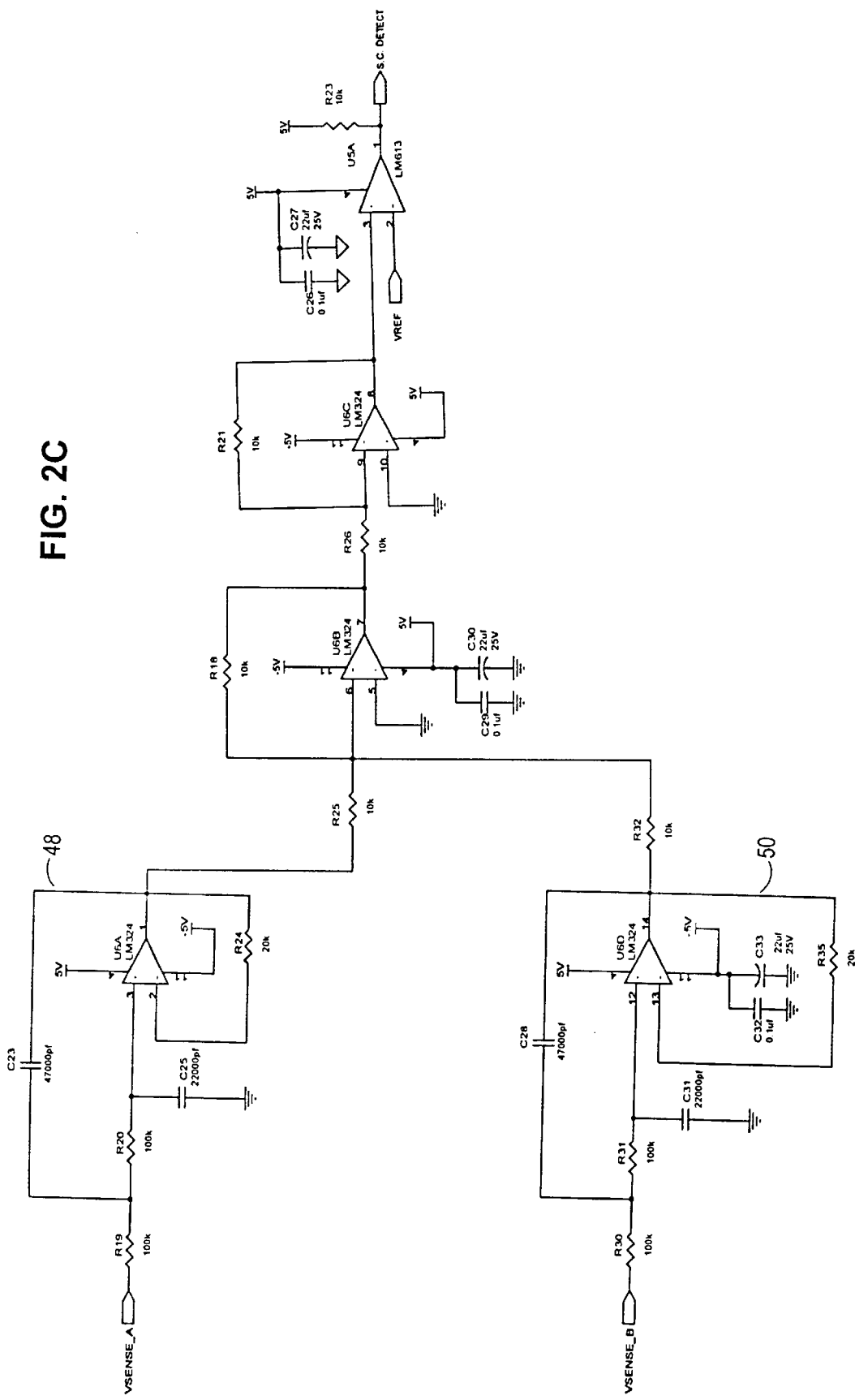

FIG. 2 shows the schematic diagram for the system of the present invention.

System 10 includes microcontroller 14 interfaced with each integrated circuit 16 and 20. Additionally, system 10 includes signal traces 48 and 50. Each of these system components is described in more detail herein.

Figure 3:
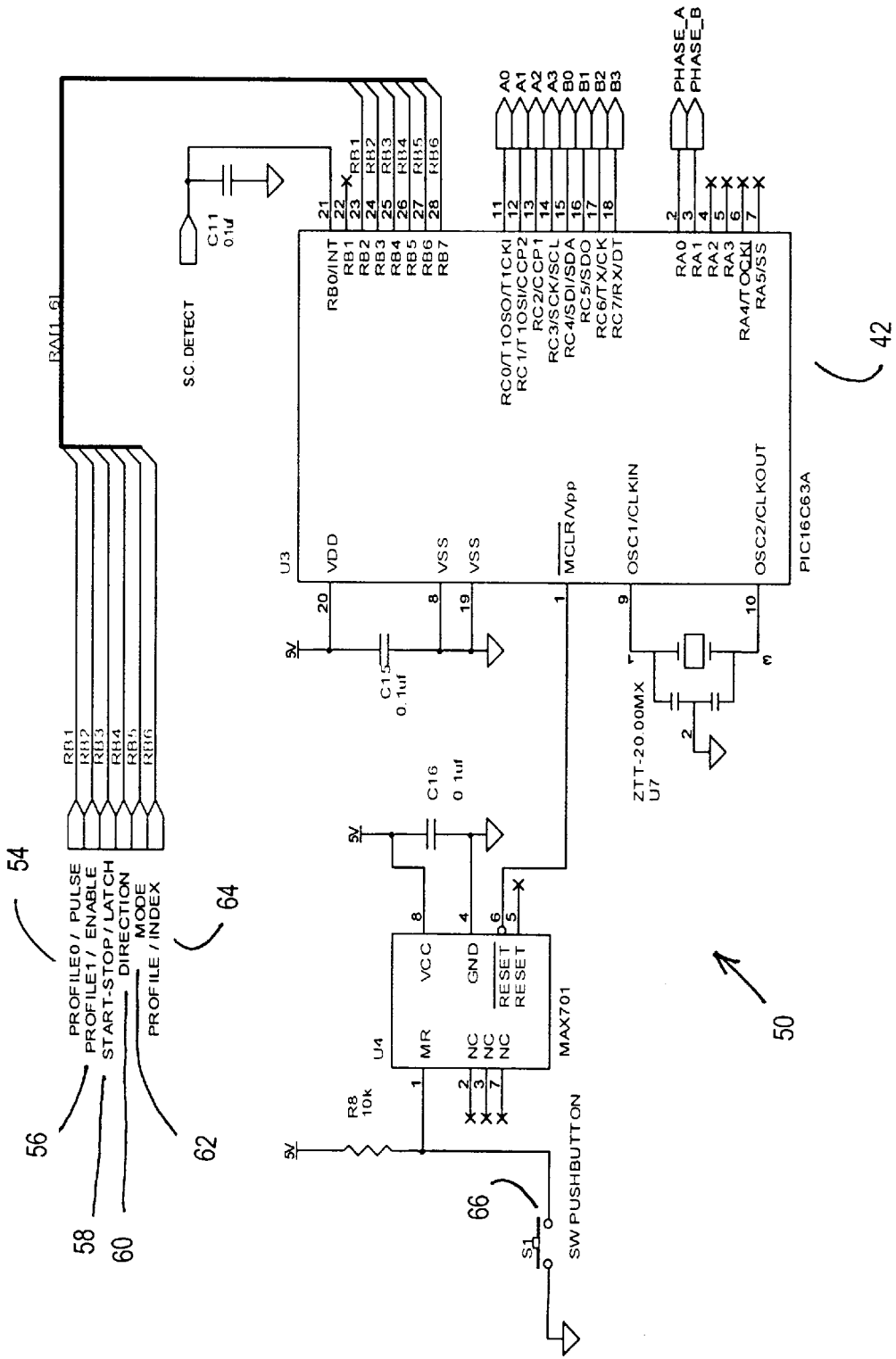
FIG. 3 is a schematic of the logic circuit utilized to control the micro-stepping motor.

The system 10 combines the integrated circuits 16 and 20 with the microcontroller 14 and driver circuit to form the system's logic circuit. There is shown in FIG. 3 a schematic of the logic circuit.

The logic circuitry 50 is responsible for communication with the system peripherals; deciding what to do based on commands from the periphery; and, executing those commands by sending out signals to the integrated circuit driver chips. The primary component in the logic circuit 50 is the low-cost, mid-range microcontroller 14. The microcontroller 14 takes care of the interface to the external drives through six (6) control bits and outputs step sequences to the integrated circuit through ten (10) signal bits. A 20 Mhz resonator is used to clock the microcontroller 14. There is also a reset chip that will reset the microcontroller when the reset push-button 66 is pressed.

The microcontroller communicates to the I.C. drivers through ten (10) bits that tell the motor to move to a certain position. Different combinations of these bits point to different positions or steps in the motor 12. Therefore, by sending out different steps, the microcontroller 14 will move the motor 12. The frequency at which these bits are sent out determines the velocity of the motor. To achieve the sinusoidal current waveform characteristic of microstepping, the microcontroller 14 needs to send out steps in a proper sequence. The timing at which these steps are sent out is critical and will affect the accuracy and reliability of the driver board.

The microcontroller 14 can run in two (2) program modes. Based on the program mode selected by the Profile/Index bit, the microcontroller 14 will run as either a stand-alone system or as a pulse controlled system. When running in stand-alone mode, control bits to the microcontroller 14 include: Profile1 56; Profile0 54; Start-Stop 58; Direction 60; Mode 62; and, Profile/index 64. The two Profile bits 54 and 56 select one of four (4) slew velocities. The Direction control bit 60 directs the motor 12 to run in the clockwise direction or counterclockwise direction. The Mode bit 62 sets the motor 12 to run in ⅛th or ¹⁄₁₆th step. The stand-alone system will accelerate the motor 12 then slew at the preprogrammed velocity selected by the Profile bits 54 and 56.

Upon a change in the control bits, the microcontroller 14 will decelerate the motor 12 to a stop then look to the control bits to determine the next course of action.

In the pulse controlled embodiment of the present invention, control bits to the microcontroller include: Pulse, Enable, Latch, Direction, Mode, and Profile/Index. The motor velocity in the Pulse controlled version is directly related to the input pulse signal. Every time the microcontroller 14 receives a pulse, it will output a step to the I.C. driver chips 110 or 120. Therefore, the system that sends out the pulse signal would also have to take care of motor acceleration.

Figure 4:
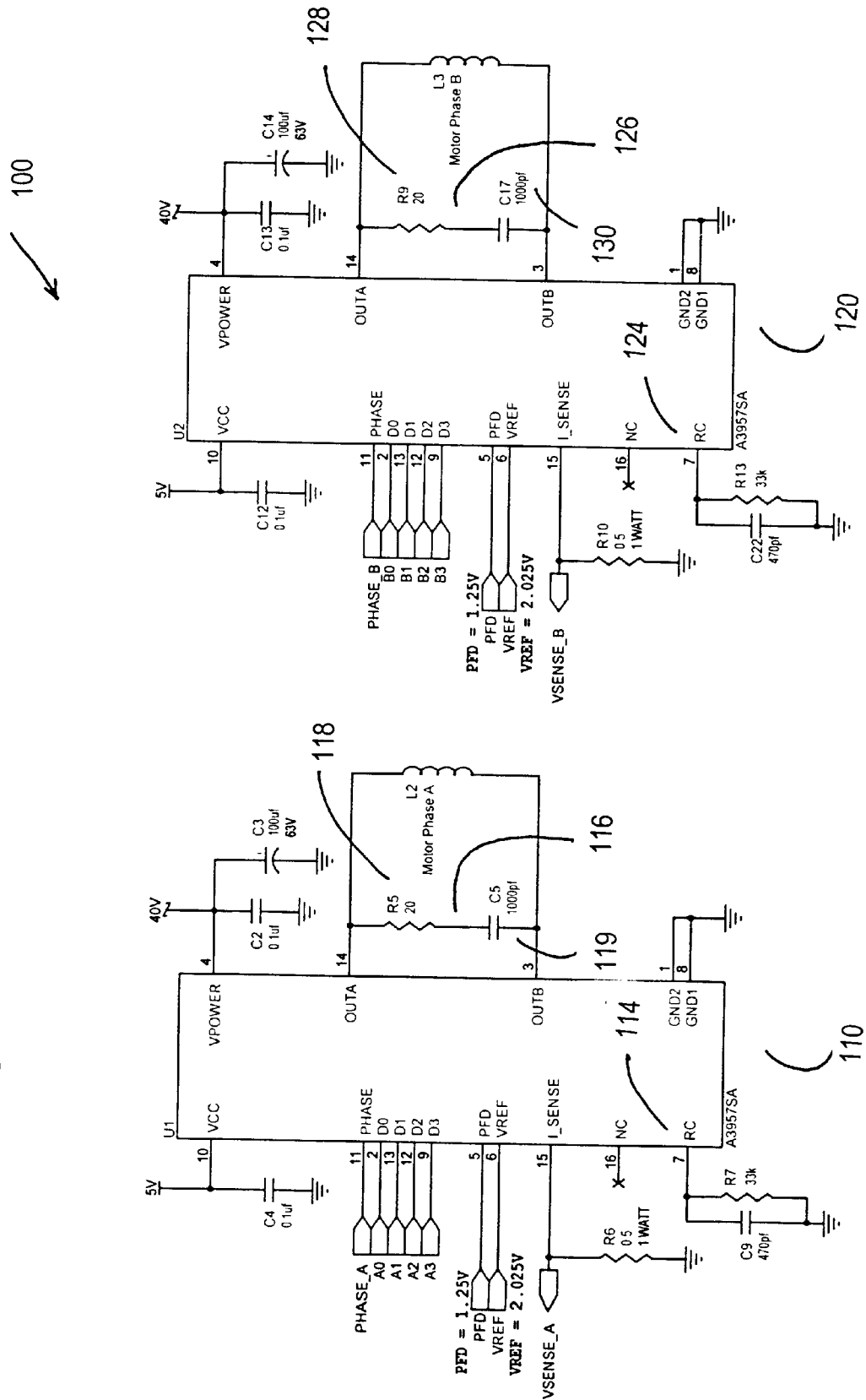
FIG. 4 is a schematic of the driver circuit utilized to drive current through the motor phases of the micro-stepping motor.

Turning to FIG. 4. there is shown the schematic of the system's driver circuit.

The driver circuit 100 is responsible for driving current through the motor phases thereby physically moving the motor 12. An I.C. chip 110 or 120 drives one phase of the motor. Since there are two (2) phases to the stepper motor, two (2) I.C. chips 110 and 120 are necessary to drive the single motor 12. The I.C. 110 or 120 is a low-cost microstepping motor driver that is capable of producing up to sixteen (16) microsteps per full step. Each I.C. chip 110 or 120 takes four (4) analog/digital (A/D) bits and a Phase bit as input. The combination of Phase and A/D bits determine the step or position of the motor 12.

The functionality of the integrated circuits 110 or 112 is influenced by a number of factors. These factors include: percent fast decay (PFD), voltage reference (VREF), and PWM off time. The PWM signal has two portions: one is in high level and the other is in low level of amplitude. The "off-time" refers to the time duration of the signal in lower level while "on-time" refers to the time duration of the the signal in the higher level. VREF and PFD are determined by a specified voltage level while the PWM off time is determined by an RC circuit 114 or 124 attached to a pin-out of the corresponding integrated circuit 110 or 120 (pin 7 of the representative A3957 I.C.). VREF and VSENSE (voltage sensing) are responsible for regulating the current through the motor 12. The snubber circuit 116 or 126 stabilizes the voltage level which in turn increases device lifetime as well as system performance levels. The snubber circuit 116 or 126, consisting of a resistor 118 or 128 and a capacitor 119 or 130, is inserted between the outputs to the motor phases from each I.C. 110 or 120.

Figure 5:
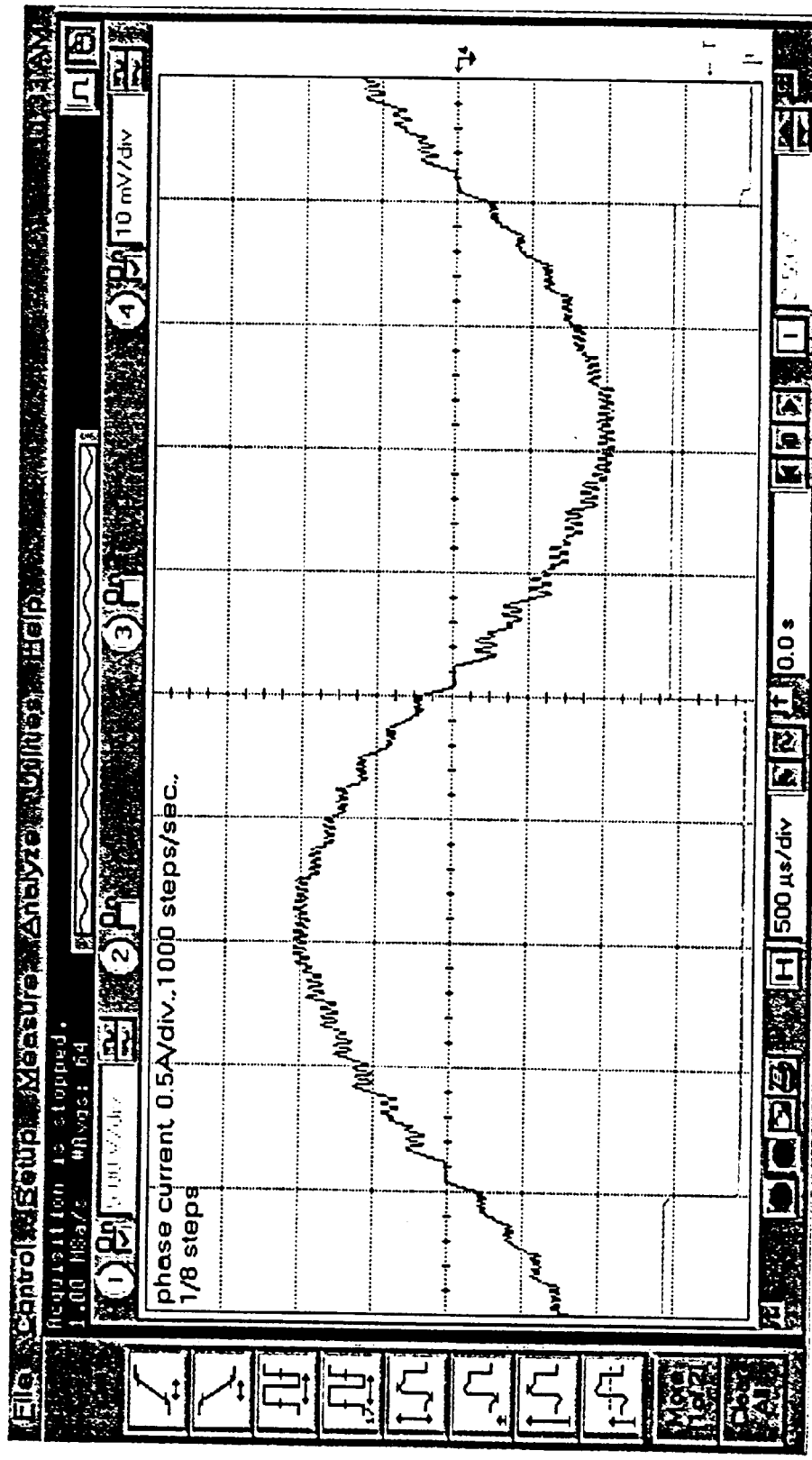
FIG. 5 is a print screen of the ⅛th step current waveform while the motor was running at 1,000 counts/sec.

Current waveforms of a motor (such as the model #P21 NRXB-LSS-SS-02 commercially available from Pacific Scientific of Rockford, Ill.) were captured with the motor running at ⅛th and 1/16th step mode. These waveforms are shown in FIG. 5 and in FIG. 6. The motor was running at 1,000 counts/sec for each current waveform capture. Full/half step current waveforms are typically trapezoidal in shape, while the microstep waveforms shown in FIGS. 5 and 6 appear more sinusoidal. With the same peak current, the RMS current in one period of a sinusoidal waveform is less than the RMS current in one period of a trapezoidal waveform. Generally, the more current going through a motor's windings, the more torque output is achieved by that motor.

Figure 6:
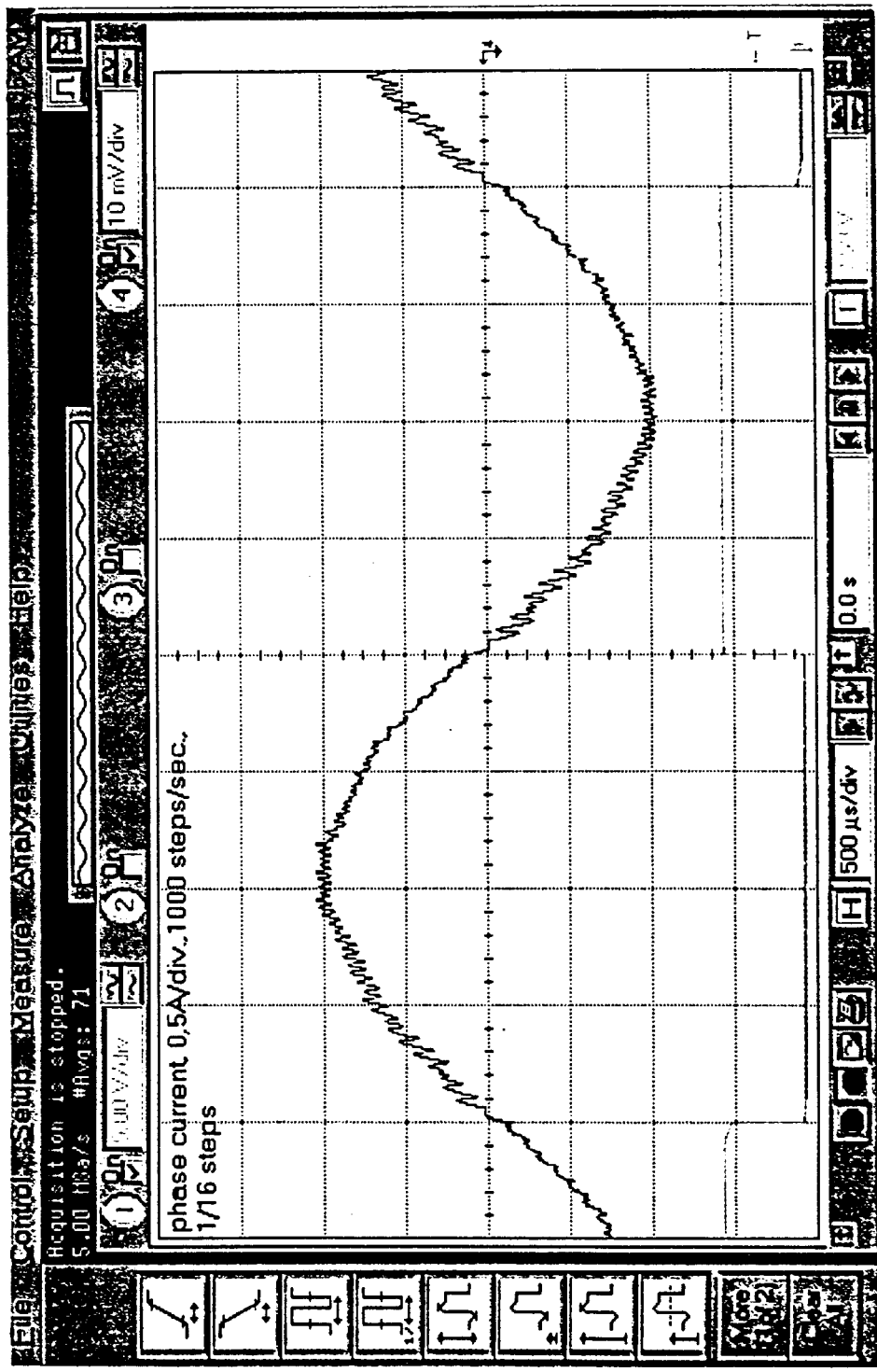
FIG. 6 is a print screen of the ¹⁄₁₆th step current waveform while the motor was running at 1,000 counts/sec.
Figure 7:
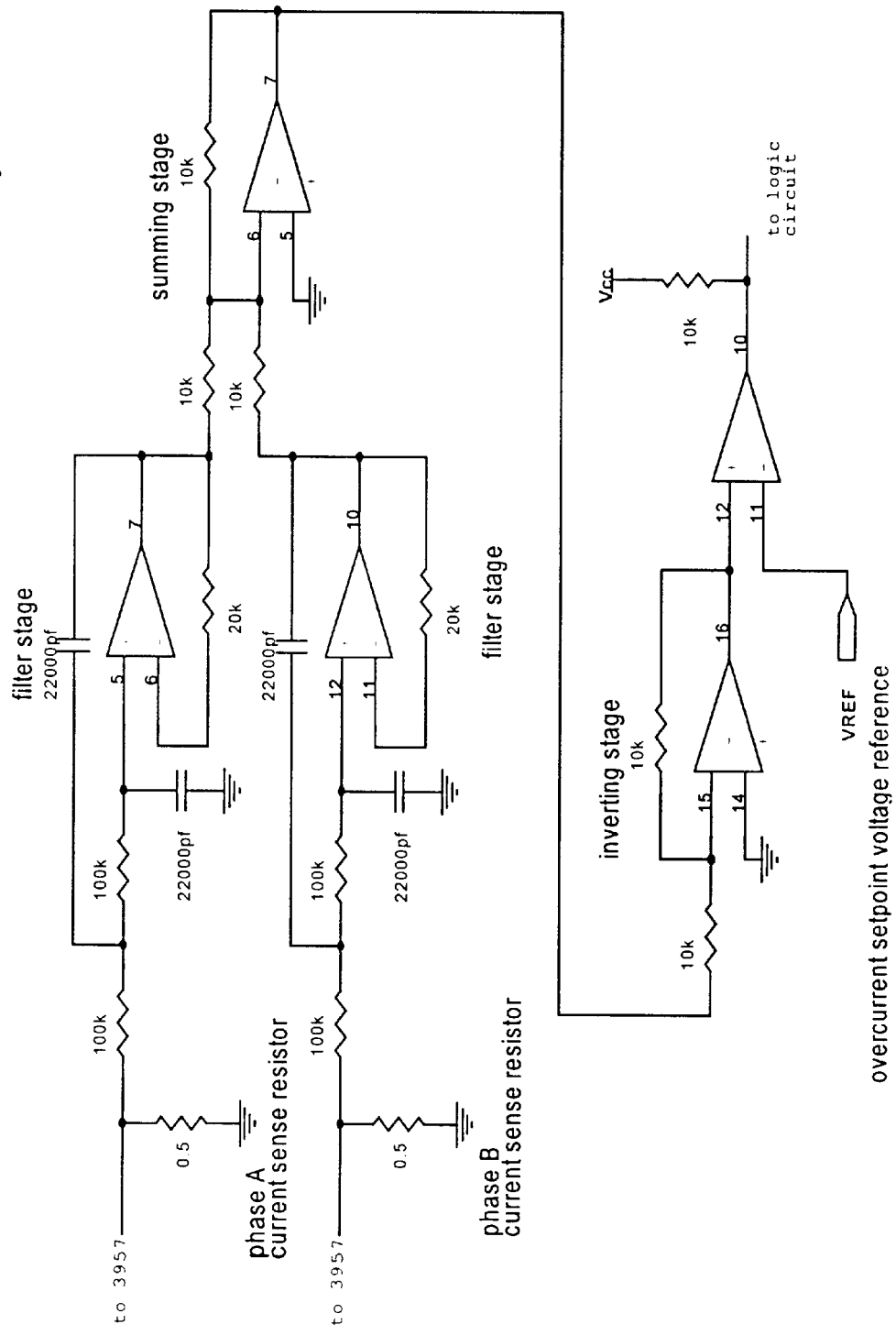
FIG. 7 is a schematic of the detector circuit utilized to detect overcurrent or short circuit conditions.

Turning to FIG. 5, there is shown a ⅛th step current waveform; and, in FIG. 6 there is shown a 1/16th step current waveform The circuitry shown in FIG. 7 performs the detection function for average current in each of the two motor phases; and, by comparison to a predefined setpoint, can signal the logic circuitry that an overcurrent or short circuit condition exists. As indicated in FIG. 7, there are three (3) stages following the current sense resistors: the filter stage; the summing stage; and, the inverting stage. These are detailed hereinbelow. The last portion of the circuit, the comparator, compares the overcurrent setpoint voltage reference (as indicated in FIG. 7) to the modified signal, and transitions a logic level signal if the actual current exceeds the setpoint.

Each of the two filter stages, one for each current sense resistor, is a Sallen-Key second order filter stage. The selection of the filter cutoff frequency is derived from a response time of approximately 20 milliseconds (ms); that is, if the motor current exceeds the desired maximum for more than 20 ms, the filter output should be at a voltage level which would indicate such. The resulting filter cutoff frequency, or fc is approximately 72 Hz, which is within an acceptable range.

Figure 8:
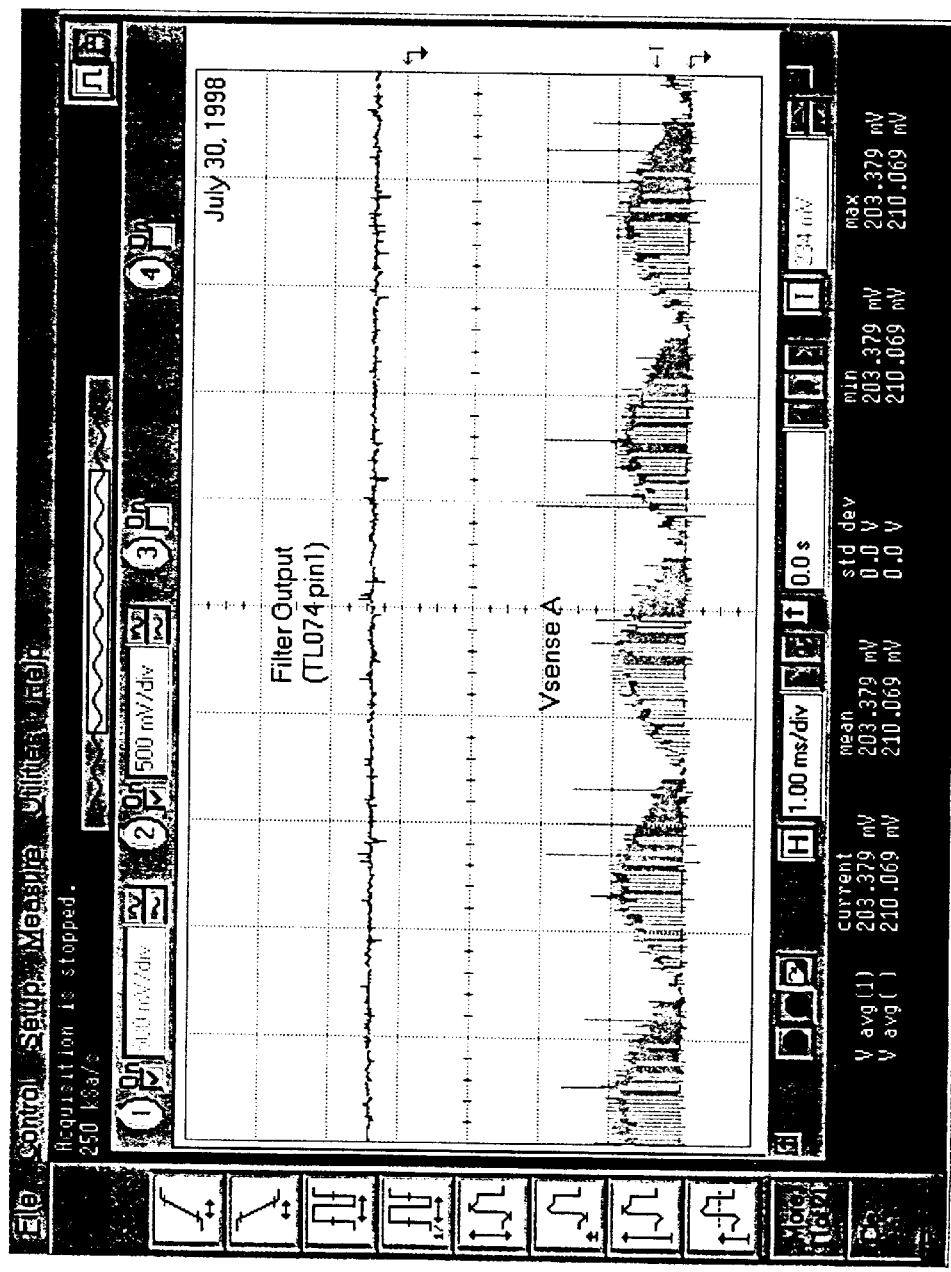
FIG. 8 is a print screen of the input and output of the circuit filter stage.

The oscilloscope trace of FIG. 8 shows the actual filter response during the operation of the microstepping controller. The lower signal trace (labeled VsenseA) shows the voltage across the current sense resistor; the upper signal trace is the voltage at the output of the filter stage, and is the filtered average of its input.

Figure 9:
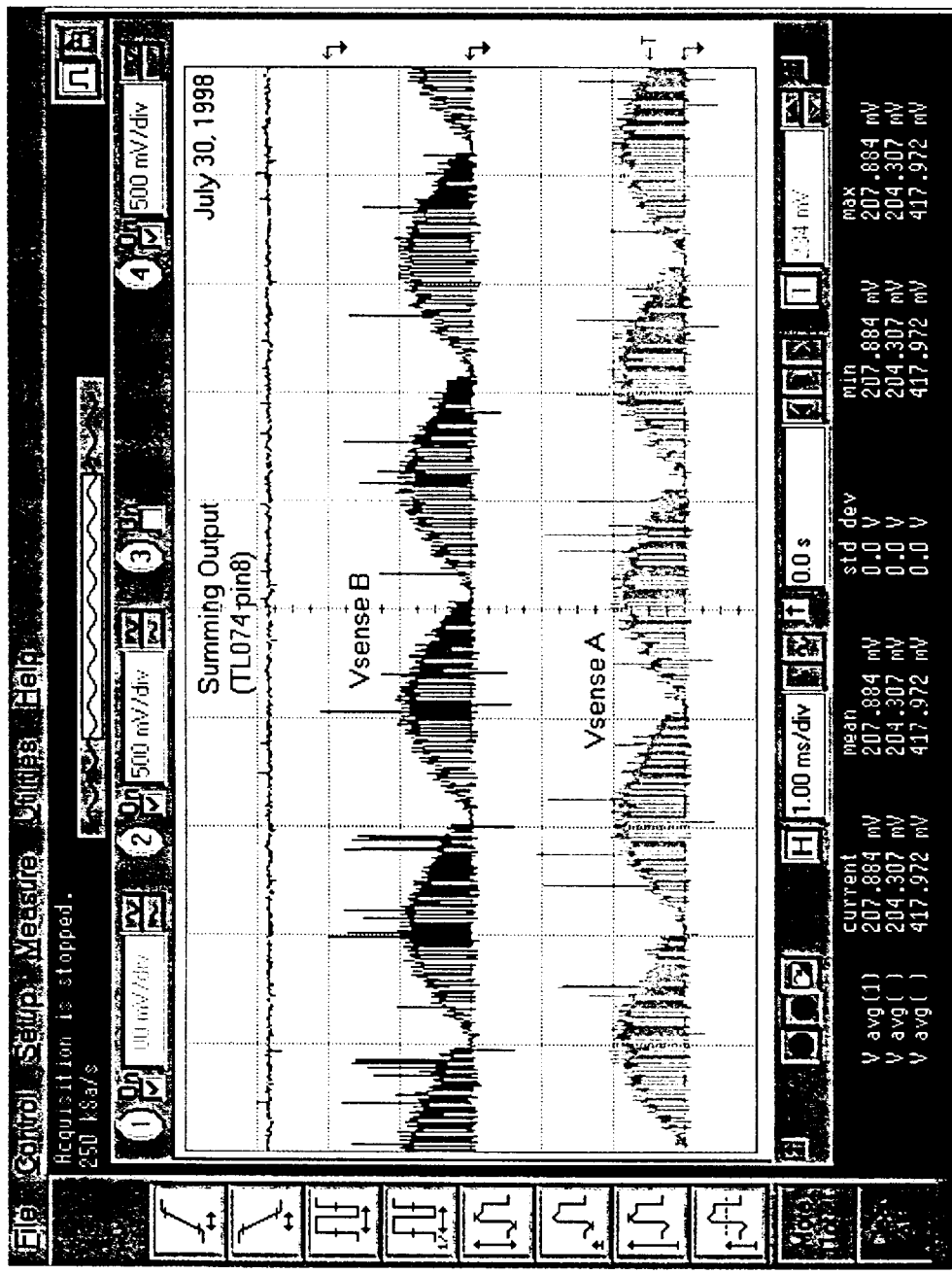
FIG. 9 is a print screen of the signal modification from filtering the two input voltages.

The summing stage, which follows the filters, takes the two individual filter outputs and adds them together to create a single voltage value related to the motor current. As is shown in FIG. 9, signal modification as a result of the first two stages following the two input voltages at each current sense resistor (lower and middle traces) are filtered and summed to produce the upper signal trace, which is roughly twice the average value of the two input waveforms (each V avg value is shown in the bottom of FIG. 9).

With the signal is filtered and summed, the last stage before the comparator inverts the summed signal with respect to ground (making it a positive voltage) for delivery to the comparator itself. By adjusting the inverting terminal of the comparator to the proper voltage level (indicated as VREF in the circuit diagram), the detection of motor current levels higher than the setpoint can be detected.

Sound pressure level (SPL) measurements were made on a Pacific Scientific P21NRXB-LSS-SS-02 1.8° stepper motor. Three different motor drives were used for comparison: the 3957/PIC micro-stepping reference design prototype, a conventional half step/full step driver featuring the ST microelectronics L297/L6203 component topology, and the Intelligent Motion Systems' IM804 driver, a commercially available driver. Using the a Hewlett-Packard HP35639A measurement system with a pressure transducer placed 6" vertically and horizontally from the center of the motor with no load, the measurements featured in TABLE 1 below were compiled.

TABLE 1

Sound Pressure Level (SPL) Measurements For Different Driver Types

| motor driver | mode | PSL @ 1 kHz (dB) | A weighted SPL (dB) |
|---|---|---|---|
| L297/L6203 | full step | 71.1 | 71.4 |
| L297/L6203 | half step | 59.4 | 62.3 |
| IM804 | ⅛ step | 55.6 | 60.3 |
| IM804 | 1/16 step | 57.7 | 61.5 |
| 3957/PIC | ⅛ step | 47.6 | 55.7 |
| 3957/PIC | 1/16 step | 48.5 | 56.1 |

All of the frequency spectrum measurements featured a 1kHz dominant component, and are included in this table, as well as the A weighted SPL. In terms of A weighted measurements, the 3957/PIC driver is approximately 15 dB below the full step driver, and roughly 6 dB below the half step mode. The prototype is also 4–5 dB below the commercial drive in 1/8th step and 1/16th step modes. A difference of 15 dB means the microstepping drive runs 31 times more quiet than in the full stepping mode. (Formula: Sound Pressure Level (Lp) in dB=10* log (P/Pref)²→(P/Pref)²=10^(Lp/10)=31.6).

While certain embodiments have been described above in terms of the system within which the method may reside, the invention is not limited to such a context.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A stepper motor drive system comprising:
   (a) a microstepping motor; and
   (b) a logic circuit, said logic circuit further comprising:
      (i) a plurality of integrated circuits for controlling one or more phases of said micro-stepping motor;
      (ii) a microcontroller for controlling said microstepping motor, said microcontroller further comprising a plurality of control bits, said microcontroller further for outputting a set of step sequences to said plurality of integrated circuits;
      (iii) a driver circuit for driving current through each one of said motor phases; and
      (iv) a plurality of snubber circuits located between the outputs of said each one of said one or more motor phases of each one of said plurality of integrated circuits, said plurality of snubber circuits for stabilizing the voltage level of said logic circuit.

2. The system of claim 1, wherein each one of said plurality of integrated circuits is a motor driver capable of producing up to sixteen microsteps per full step.

3. The system of claim 1, or claim 2, wherein each one of said plurality of integrated circuits takes a plurality of analog/digital bits and a phase bit as input.

4. The system of claim 1, wherein said control bits further comprise a direction bit, a mode bit and a profile/index bit.

5. The system of claim 4, wherein said microcontroller can run in one of two program modes as selected by said profile/index bit, said program modes further comprising a stand-alone mode and a pulse controlled mode.

6. The system of claim 5, wherein said stand-alone mode utilizes two profile bits to select one of a set of four slew velocities.

7. The system of claim 6, wherein said stand-alone mode will accelerate said microstepping motor then slew at a preprogrammed velocity as selected by said two profile bits.

8. The system of claim 5, wherein the motor velocity of said microstepping motor is directly related to an input pulse signal wherein each time said microcontroller receives said input pulse signal said microcontroller will output a step to said plurality of integrated circuits.

9. The system of claim 4, wherein said direction bit directs said microstepping motor to run in a clockwise or a counterclockwise direction as determined by a system configuration.

10. The system of claim 4, wherein said mode bit sets said microstepping motor to run in 1/8th or 1/16th step.

11. The system of claim 1, wherein each one of said plurality of snubber circuits further comprises a resistor and a capacitor.

12. A stepper motor drive system comprising:
   (a) a microstepping motor; and
   (b) a logic circuit, said logic circuit further comprising:
      (i) a plurality of integrated circuits for controlling one or more phases of said microstepping motor;
      (ii) a microcontroller running as a stand-alone system for controlling said microstepping motor:
         (1) said microcontroller further comprising a plurality of control bits, said control bits including two profile bits, wherein said two profile bits are used to select one of a set of four slew velocities for said microstepping motor, and wherein further said stand-alone system will accelerate said microstepping motor then slew at a preprogrammed velocity as selected by said two profile bits;
         (2) said microcontroller further for outputting a set of step sequences to said plurality of integrated circuits;
      (iii) a driver circuit for driving current through each one of said motor phases; and
      (iv) a plurality of snubber circuits located between the outputs of said each one of said one or more motor phases of each one of said plurality of integrated circuits, said plurality of snubber circuits for stabilizing the voltage level of said logic circuit.

13. The system of claim 12, wherein said control bits include a direction bit, said direction bit for directing said microstepping motor to run in a clockwise or a counterclockwise direction as determined by a system configuration.

14. The system of claim 12, wherein said control bits include a mode bit, said mode bit for setting said microstepping motor to run in 1/8th or 1/16th step.

15. The system of claim 12, wherein each one of said plurality of snubber circuits further comprises a resistor and a capacitor.

16. A stepper motor drive system comprising:
   (a) a microstepping motor; and
   (b) a logic circuit, said logic circuit further comprising:
      (i) a plurality of integrated circuits for controlling one or more phases of said microstepping motor, and wherein the motor velocity of said microstepping motor is directly related to an input pulse signal wherein each time said microcontroller receives said input pulse signal said microcontroller will output a step to said plurality of integrated circuits.
      (ii) a micro-controller running as a pulse controlled system for controlling said microstepping motor, said microcontroller further comprising a plurality of control bits, said microcontroller further for outputting a set of step sequences to said plurality of integrated circuits;
      (iii) a driver circuit for driving current through each one of said motor phases; and
      (iv) a plurality of snubber circuits located between the outputs of said each one of said one or more motor phases of each one of said plurality of integrated circuits, said plurality of snubber circuits for stabilizing the voltage level of said logic circuit.

17. The system of claim 16, wherein said control bits further comprise a direction bit, a mode bit and a profile/index bit.

18. The system of claim 17, wherein said direction bit directs said microstepping motor to run in a clockwise or a counterclockwise direction as determined by a system configuration.

19. The system of claim 17, wherein said mode bit sets said microstepping motor to run in 1/8th or 1/16th step.

20. The system of claim 16, wherein each one of said plurality of snubber circuits further comprises a resistor and a capacitor.

* * * * *